United States Patent [19]

Kimura

[11] Patent Number: 4,819,222

[45] Date of Patent: Apr. 4, 1989

[54] BINARY ENCODING METHOD FOR DATA READ FROM OPTICAL RECORD AND DEVICE THEREFOR

[75] Inventor: Fumio Kimura, Tokyo, Japan

[73] Assignee: Computer Services Corporation, Tokyo, Japan

[21] Appl. No.: 853,913

[22] Filed: Apr. 21, 1986

[30] Foreign Application Priority Data

Apr. 22, 1985 [JP] Japan .................. 60-85698
Apr. 22, 1985 [JP] Japan .................. 60-85699

[51] Int. Cl.⁴ .............................................. G11B 7/00
[52] U.S. Cl. ...................................... 369/124; 369/44; 369/59; 369/116
[58] Field of Search ................. 369/44, 59, 116, 124

[56] References Cited

U.S. PATENT DOCUMENTS

| | | | |
|---|---|---|---|
| 3,988,531 | 10/1976 | Laub | 369/124 |
| 4,017,903 | 4/1977 | Chu | 360/40 |
| 4,074,149 | 2/1978 | Naaijer | 307/351 |
| 4,145,758 | 3/1979 | Drexler et al. | 358/128 |
| 4,264,935 | 4/1981 | Lee | 360/45 |
| 4,269,917 | 5/1981 | Drexler et al. | 430/16 |
| 4,278,756 | 7/1981 | Bouldin et al. | 430/414 |
| 4,278,758 | 7/1981 | Drexler et al. | 430/616 |
| 4,345,412 | 8/1982 | Conley | 360/46 |
| 4,360,728 | 11/1982 | Drexler | 235/462 |
| 4,380,015 | 4/1983 | Ito et al. | 369/116 |
| 4,385,372 | 5/1983 | Drexler | 360/109 |
| 4,500,777 | 2/1985 | Drexler | 235/487 |
| 4,542,288 | 9/1985 | Drexler | 235/487 |
| 4,544,835 | 10/1985 | Drexler | 235/487 |
| 4,562,549 | 12/1985 | Tanaka et al. | 364/486 |
| 4,568,887 | 2/1986 | Bierhoff | 369/59 |
| 4,572,965 | 2/1986 | Yamamura | 369/59 |
| 4,603,413 | 7/1986 | Sinjou et al. | 369/59 |
| 4,698,797 | 10/1987 | Komatsu | 369/116 |

Primary Examiner—Patrick R. Salce
Assistant Examiner—Anita M. Ault
Attorney, Agent, or Firm—Cushman, Darby & Cushman

[57] ABSTRACT

This invention relates to a binary encoding method for reading the data from an optical record comprising steps of photo-electrically reading the optically recorded data which are encoded into binary codes with an FM encoding method and of comparing thus obtained video signals with a threshold to encode the same into binary codes and the device therefor.

This invention is featured by the structure that the mark rate of binary encoded signals are detected to obtain the deviation thereof from a preset mark rate and the reading sensitivity of a reading means is adjusted based on said deviation in a manner to make the mark rate of the binary encoded signals identical to the preset mark rate.

This invention is further characterized by the structure that video signals are binary encoded by plural groups of binary encoding means on the basis of different thresholds and the binary encoded signals of the group having the optimal mark rate are selected.

8 Claims, 8 Drawing Sheets

Fig. IA
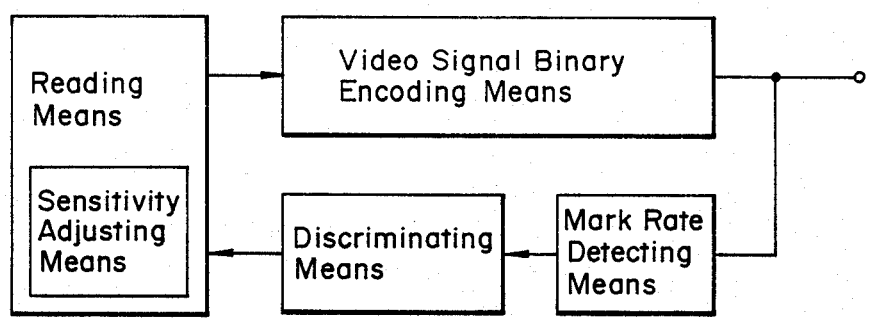
Fig. IB
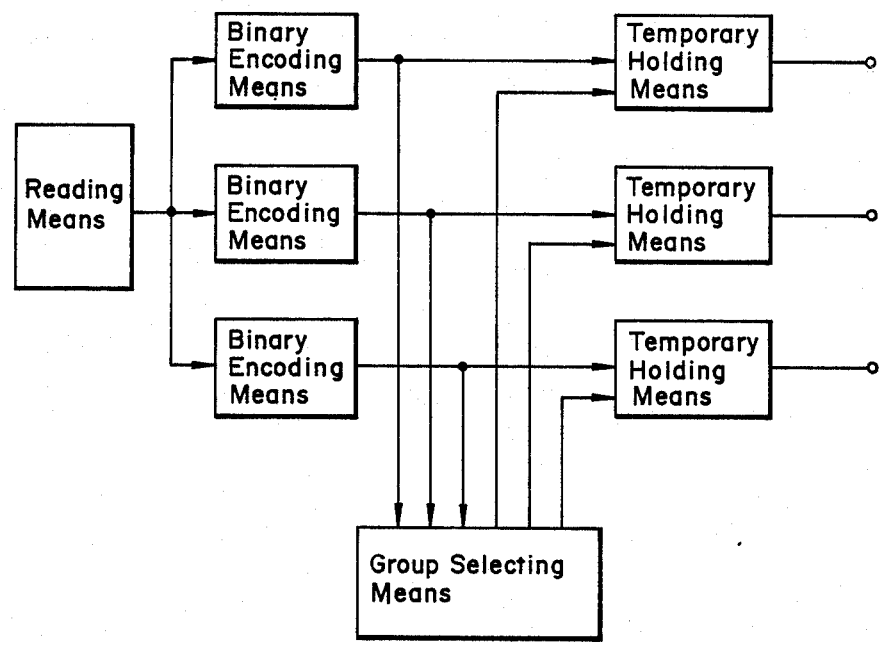

| | | Mark Rate |
|---|---|---|
| 0 0 0 | 0 0 0 | 4/6 |
| 0 0 1 | 0 0 1 | 3/6 |
| 0 1 0 | 0 1 0 | 3/6 |
| 0 1 1 | 0 1 1 | 4/6 |
| 1 0 0 | 1 0 0 | 3/6 |
| 1 0 1 | 1 0 1 | 4/6 |
| 1 1 0 | 1 1 0 | 4/6 |
| 1 1 1 | 1 1 1 | 3/6 |

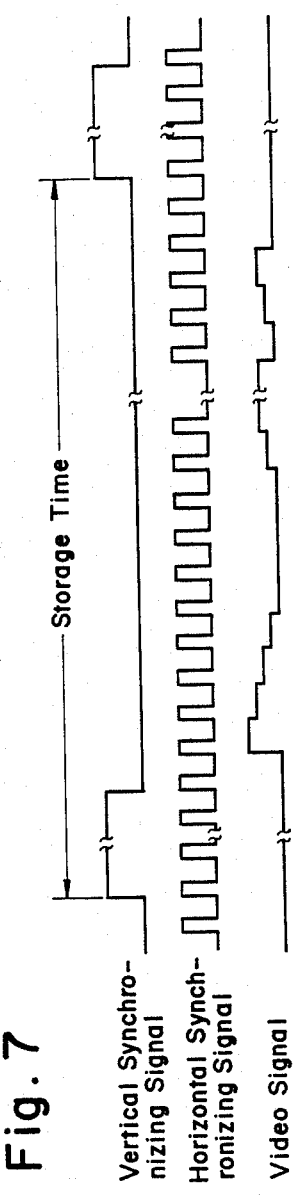
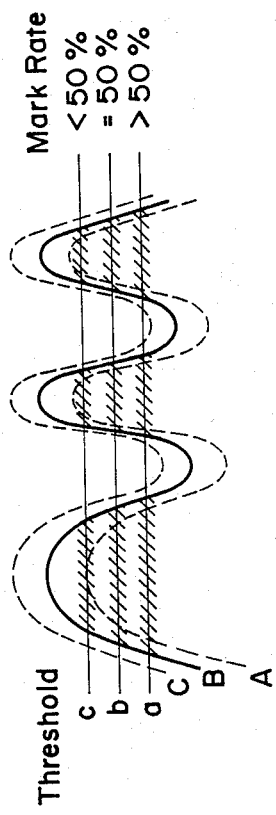

BINARY ENCODING METHOD FOR DATA READ FROM OPTICAL RECORD AND DEVICE THEREFOR

INDUSTRIAL APPLICATION

This invention relates to a binary encoding method for reading optically recorded data which photo-electrically reads with a reading means data which are recorded in binary codes on an optical recording medium by an FM encoding method, compares obtained video signals with a threshold value and encodes the same into binary codes and the device therefor.

PRIOR ART

Optical recording media generally record data in binary codes by utilizing changes in optical property of substances. For example, an optical memory card is punched at predetermined positions in an optical recording region to record data by using the difference in reflectance between holes and unpunched places. Data may be recorded photographically by forming dark and light patterns corresponding to binary codes.

The recorded data may be reproduced by, for instance, emitting light onto the optical recording medium, reading the light reflected from the medium with photo-sensors, and converting the presence/absence of holes into output signals by the photo-sensors. In other words, the difference in the amount of reflected light caused by the holes are converted into electric signals with the photo-sensors to be outputted. In reading out the holes, they are not read individually, but a group of holes are scanned as a data train with a CCD linear sensor at a predetermined rate to output the presence/absence of holes in the form of a series of video signals.

In this type of reproduction, the result discriminated from the difference in the amount of light should naturally be logical values of one bit to indicate whether or not there is a hole. These logical values are read out by converting the video signals obtained by photo-sensors into binary codes.

In the prior art, video signals are converted into binary codes by comparing a series of video signals with a threshold value to discriminate the signals into two groups, i.e. those higher than the threshold value and those lower than that. The prior art technology, however, is detrimental in the following aspects.

PROBLEMS TO BE SOLVED BY THIS INVENTION

It is difficult to set a threshold value in the prior art for encoding video signals into binary codes.

More specifically, due to the limitation in mechanical precision of reading devices, the positional relation between an optical recording medium and sensors becomes deviated or an optical recording medium is distorted to thereby make video signals out of the sensors unstable. This problem will now be described in more detail referring to FIG. 5.

In FIG. 5, the states illustrated as (a) and (b) show the condition where the level of the video signals is higher as a whole than the threshold value or the result of reading the state when the amount of the reflected light is large. The states denoted as (c) and (d) show the condition where the level of the whole video signals is lower than the threshold value or the amount of the reflected light is insufficient. Binary signals corresponding to these states are illustrated in the figures.

As the above result shows, conversion of video signals into binary codes is considerably affected by the relative relation between the video signal level and the threshold level. It is therefore highly critical to set the threshold value at an optimal level.

However, the output level of video signals fluctuates with the changes in intensity of reflected light caused by mechanical deviation or the like and heretofore presented an extreme difficulty in the threshold value setting.

This invention was contrived to solve such a problem encountered in the prior art. It aims at providing a binary encoding method for reading optically recorded data which is capable of converting stably video signals into binary codes by correcting unstable factors in video signals caused by unstable positional relation between an optical recording medium and sensors due to limited mechanical precision of the reading devices or distortion of the recording medium per se and maintaining the threshold value at a given value, and the device therefor.

SUMMARY OF THE INVENTION

This invention relates to a binary encoding method for reading with a reading means optically recorded data in binary codes by an FM encoding method, comparing thus obtained video signals with a threshold value and converting them into binaries and the device therefor.

The first aspect of this invention provides a binary encoding method for reading optically recorded data which is characterized by the steps of detecting the mark rate of binary signals (the ratio of either high or low state of the binary codes in a unit of time in an FM encoding method), comparing thus detected value with a preset mark rate to obtain the deviation therebetween, and adjusting the reading sensitivity of the reading means in correspondence with the deviation in a manner to give the binary coded signals with the preset mark rate.

The second aspect of this invention relates to a device having a video signal binary encoding means in order to realize the first invention and comprising, as shown in FIG. 1A, a mark rate detecting means which detects the mark rate of said binary signals, a discriminating means which compares the detected value with a preset mark rate to obtain the deviation therebetween and outputs deviation signals to a reading means, and a sensitivity adjusting means provided at the reading means which modifies the reading sensitivity of the reading means in correspondence to the deviation to give the binary signals with the preset mark rate.

The third aspect of this invention provides a binary encoding method for reading optically recorded data comprising the steps of distributing the video signals into plural groups and encoding them into binaries based on different thresholds respectively, sampling either high or low states of the binary signals in each of the groups in synchronization with a predetermined sampling signal to count the number at the state respectively, comparing the counted values in each group in a unit time with a preset mark rate and outputting the binary signals of the group which has the counted value closest to the preset mark rate as a normal signal.

The fourth aspect of this invention relates to a device to realize the third invention which comprises, as shown in FIG. 1B, binary encoding means of plural groups which encode video signals into binaries on the basis of different thresholds respectively, temporary holding means of plural groups which temporarily hold the signals encoded into binary signals by binary encoding means in correspondence to each group thereof, and a group selecting means which compares either high or low state of the binary signals encoded by the binary encoding means within a unit time with a preset mark rate and directs a temporary holding means of the group which has the mark rate closest to the preset mark rate to output the binary signals.

OPERATIONAL EFFECT

If the threshold value is fixed at a level as above mentioned, it is extremely difficult to encode video signals into binary codes stably and precisely as they tend to fluctuate by various factors such as a mechanical deviation caused by transfer of the optical recording medium, etc. This invention was conceived by noting the fact that when data are encoded by the FM encoding method, the mark rate thereof becomes substantially constant (e.g. 50%) to solve the aforementioned problems.

The first and second inventions of this application utilize the fact that the amount of light received by respective photodetectors of the CCD linear sensor can be adjusted by modifying the storage time or the interval of vertical synchronizing signals, or changing the intensity of the light source and attempt to make the mark rate of binary video signals substantially identical to the preset value by shortening the storage time at the sensor if the rate of the time during which amplitude of the video signal waveforms higher than the threshold in a unit time exceeds a preset rate (for example, 50%), or by extending the storage time if the time is less than the preset value so as to substantially approximate the mark rate of binary video signals to the preset value. This enables output video signals to be encoded into binaries stably while maintaining the threshold constant.

The third and fourth inventions attempt to set plural threshold of different levels for video signals, encode them based on respective thresholds, compare the rate of high or low state of binary signals within a unit time with a preset mark rate and employ the data having the rate closest to the preset mark rate as proper data.

The FM encoding method which is a prerequisite for application of this invention will now be described.

The FM encoding method, as shown in FIG. 2(a), represents "1" with a pulse which has high and low states within a unit length and "0" with a pulse which has either high or low state within a unit length. As is clear from comparison of the FM method to NRZ method (Non-return-to-zero method) shown in FIG. 2(b), the mark rate in the FM encoding method is ca. 50%.

Explanation will be given below to the mark rate in the FM encoding method. FIG. 3 shows examples of 3 bit data. The figure shows that when a data of n bit is encoded by the FM encoding method, the mark rate M may be represented by the following two equations:

$$M = \tfrac{1}{2} (=n/2n)$$

$$M = (n+1)/2n$$

The equations indicate that if n increases to a certain level, the mark rate M can be approximated to 50% to substantiate the said finding.

The mark rate according to the FM encoding method is 50% in the aforementioned examples, but it may be 75% or 25% depending on the modes of encoding.

When the data recorded by the FM encoding method on an optical recording medium is read out with a CCD linear sensor, if the data on the optical recording medium is in the pattern shown in FIG. 4(a), for example, the video signals obtained will have the waveforms shown in FIG. 4(b). These video signals do not rise sharply due to the influence from the resolution of optical system or the sensors or distortion of images.

These video signals are encoded into binary codes by being compared to a predetermined threshold, as mentioned above, but if the levels thereof are affected by various factors and fluctuate, the result becomes as shown in FIG. 5. This phenomenon is unavoidable unless a correctional measure is taken as to the intensity of the light reflected from the optical recording medium.

The first and second inventions are based on the aforementioned principle. The operational effect thereof will be described hereinbelow.

In the device structured as above, the mark rate detecting means detects the mark rate of signals outputted from the video signal binary encoding means. The detection can be conducted by, for instance, counting the rate of high level signals in a unit time.

The discriminating means compares such detected value with a preset mark rate to output deviation signals which corresponds to the deviation between the above two values.

As a result, the reading means adjusts the storage time of CCD linear sensor to correspond to the deviation signals to increase or decrease the level of the output video signals and output video signals having the optimal level in relation to the threshold or having a mark rate identical to the predetermined mark rate. In this manner, the first and second inventions can correct instability of the video signals from sensors which are otherwise caused by limitation in mechanical precision in a reading device, mis-alignment between the position of a card and that of sensors or distortion of the card per se, and encode video signals into binary codes precisely while maintaining threshold at a constant value.

The third and fourth inventions partially differ from the first and second inventions in structure. More particularly, according to the third and fourth inventions of this application, the video signals having the wave forms shown in FIG. 4 (b) are encoded in parallel by binary encoding means of plural groups. The number of pulses of binary output signals from each group is respectively counted to obtain the number of either high or low states within a unit time for each group, and the binary output from the binary encoding means of the group which has the value closest to the preset mark rate is employed as a correct data.

Before encoding video signals into binary codes by distributing them into plural groups, thresholds for each group are set at different levels. For instance, a threshold c is set to correspond to the level close to the peak of the bell-shaped wave form at the normal level of output video signals, another threshold b is set to correspond to the level at the half amplitude level, and another threshold a is set to correspond to the level at the bottom of the wave form. The relation among the thresholds a, b and c can be expressed as below:

Threshold a < Threshold b < Threshold c

In each group the video signal is compared with the threshold which is respectively set for the group to be converted into a binary signal.

As described above, according to this invention, video signals the average level of which fluctuates can be converted into binary signals on the basis of the mark rate which is closest to a predetermined value (for instance, 50%) among the mark rates of plural thresholds and employed as correct data. Even though the video signals suffer from instability caused by the deviation in the positional relation between the optical recording medium and the sensor due to the limited mechanical precision in reading devices or distortion in the optical recording medium per se, this invention system can properly correct such instability. Moreover, even if output video signals are not precisely crenelated but almost serrated, they can be dealt with properly with any one of the thresholds to precisely read out optically recorded data.

BRIEF DESCRIPTION OF DRAWINGS

FIGS. 1A and 1B are block diagram to show the structure of this invention;

FIG. 7 is wave forms to show the relation among the vertical synchronizing signals, horizontal synchronizing signals and video signals;

FIG. 11 is an explanatory view to show the relation between the video signal wave forms and thresholds.

EMBODIMENTS

This invention will now be described by referring to preferred embodiments shown in the attached drawings. In the following embodiments, this invention is applied to a reading device which reads out data from an optical recording medium; the medium in this case is an optical memory card.

STRUCTURE OF THE FIRST EMBODIMENT

Figure 6:
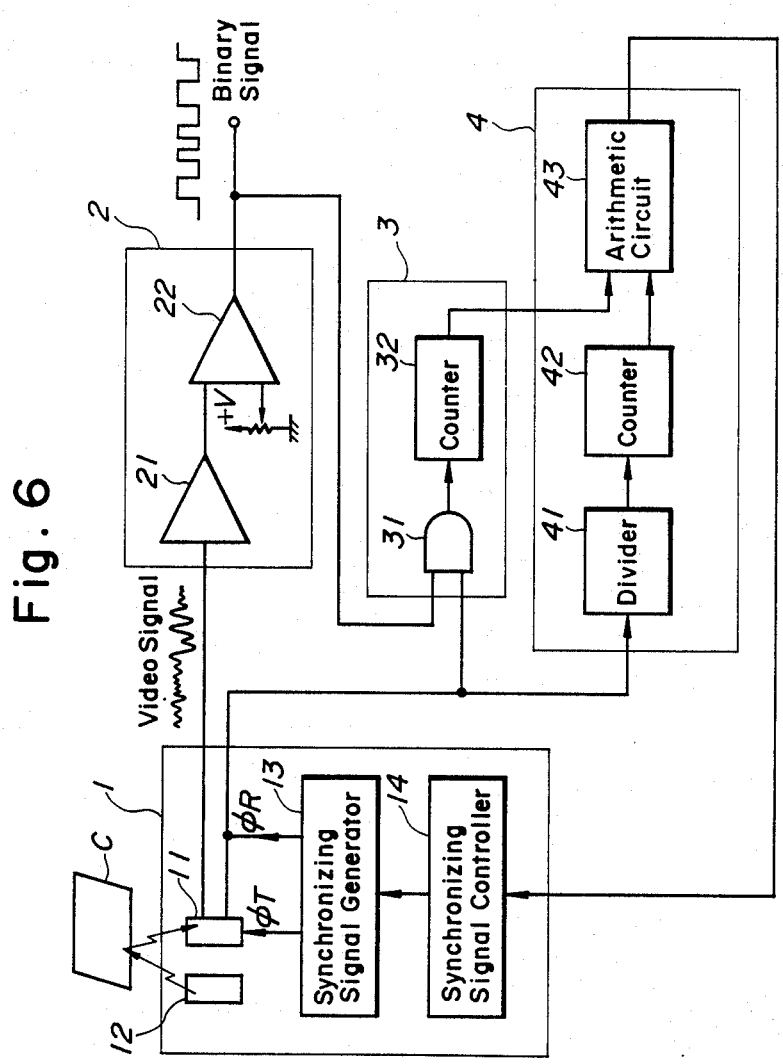
FIG. 6 is a block diagram of the first embodiment of this invention.

FIG. 6 shows the structure of the binary encoding method for reading recorded data and the device therefor according to the first embodiment of this invention. The first embodiment device shown in the figure comprises a reading means 1 which is opposedly positioned to an optical memory card C to read data therefrom, a video signal binary encoding means 2 which converts the video signals from the means 1 into binary codes, a mark rate detecting means 3 which detects the mark rates of the output signals, and a discriminating means 4 which compares the detected values with a preset mark rate and outputs a deviation signal corresponding to the deviation between said two values to the reading means 1.

The reading means 1 includes a CCD linear sensor 11 which reads out the data at the position opposing the optical memory card C and a light source 12, and further includes a synchronizing signals $\phi T$ and horizontal synchronizing signals $\phi R$, and a synchronizing signal control circuit 14 which is a sensitivity adjuster to adjust the output intervals of the vertical synchronizing signals $\phi T$ in correspondence to the deviation signals outputted from the discriminating means 4.

The video signal binary encoding means 2 comprises an amplifier 21 which amplifies the video signals, and a comparator 22 which compares the output voltage thereof with a preset threshold voltage. The comparator 22 may, for instance, comprise an operational amplifier which compares the video signals with the threshold to output binary signals.

The mark rate detecting means 3 comprises an AND gate 31 which functions as a sampler for sampling either the high level or the low level signals (in this embodiment the high level signals) from the output binary signals from the comparator 22 and a counter 32 which counts the number of the sampled high level signals.

The discriminating means 4 comprises a divider 41 and a counter 42 for setting the mark rate or the reference, and an arithmetic circuit 43 for comparing the set mark rate with said detected mark rates to obtain the deviation therebetween.

OPERATIONAL EFFECT OF THE FIRST EMBODIMENT

Referring to aforementioned figures and FIG. 7, the operational effect of this first embodiment will now be described.

In the device structured as above, the CCD linear sensor 11 receives on the photodetectors thereof (not shown) the light which is emitted from the light source 12 and reflected from the data recording surface of the optical memory card. The CCD linear sensor 11 outputs in analog values the voltage which is in proportion to the amount of the light on one photodetector for each pulse of the horizontal synchronizing signal $\phi R$ from the synchronizing signal generator 13. As shown in FIG. 7, when it has received the horizontal synchronizing signals $\phi R$ in the number equivalent to the number of the elements (or photodetectors) of the CCD linear sensor, the synchronizing signal generator 13 generally starts outputting the vertical synchronizing signals $\phi T$ for starting the next scanning.

However, in the case of the CCD linear sensor 11, the interval between adjacent vertical synchronizing signals corresponds to the exposure time of a camera and is called a storage time. The longer the storage time becomes, the higher becomes the level of the video signals at the next scanning. It is not necessary, therefore, to input a vertical synchronizing signal $\phi T$ immediately after the horizontal synchronizing signals have been inputted in the number equivalent to the number of elements in the linear sensor.

In this embodiment, the level of the whole video signals are changed by adjusting the storage time in a manner that amplitudes of wave forms of video signals extend above and below the threshold voltage of the comparator 22 and the rate above and below the threshold becomes respectively 50% (which corresponds to the mark rate).

In order to achieve such manipulation, the AND gate 31 samples the high level portion of the binary signals outputted from the comparator 22 shown in FIG. 6. This sampling is in synchronization with the horizontal synchronizing signals $\phi R$ from the generator 13 to discriminate whether or not the level of the wave form of the binary signal output at a high level when the horizontal synchronizing signal $\phi R$ is inputted, and to sample it if it is in the high level.

The high level signals thus sampled are counted by the counter 32 in a cumulative manner until the time it is reset with an appropriate reset signal herein.

The discriminating circuit 4 divides the horizontal synchronizing signals $\phi R$ into two halves with the divider 41 and the counter 42 counts the result. As the horizontal synchronizing signals $\phi R$ are divided into two halves, the value counted here becomes one half of the cumulative counted values of the signals $\phi R$ to correspond to the mark rate of 50%. This counted value therefore can automatically set the reference mark rate.

As the mark rate is set at 50% in this embodiment, the frequency is divided into two halves, but if the mark rate is not 50%, the dividing ratio should be adjusted.

The values counted at said counters 32, 42 are compared at the arithmetic circuit 43. In other words, the values are compared to the reference value which is the value counted at the counter 42 to obtain the deviation therefrom. The degree of deviation of the values counted at the counter 32 from the mark rate of 50% is outputted as deviation signals.

The synchronizing signal controller 14 adjusts the interval of the outputs of the vertical synchronizing signals $\phi T$ in correspondence with the deviation signals. More particularly, if the mark rate detected from the binary signals is higher than 50%, it shortens the storage time; but if it is lower than 50%, it extends the storage time to thereby adjust the interval of vertical synchronizing signals $\phi T$.

As a result, the data on the mark rate detected when video signals are converted into binary signals can be fed back and the output level of the video signals is automatically adjusted to achieve the mark rate of 50%. By conducting such processing, encoding of the video signals into binary signals can be performed precisely to enchance the precision in reading by the reading device.

STRUCTURE AND OPERATIONAL EFFECT OF THE SECOND EMBODIMENT

Figure 8:
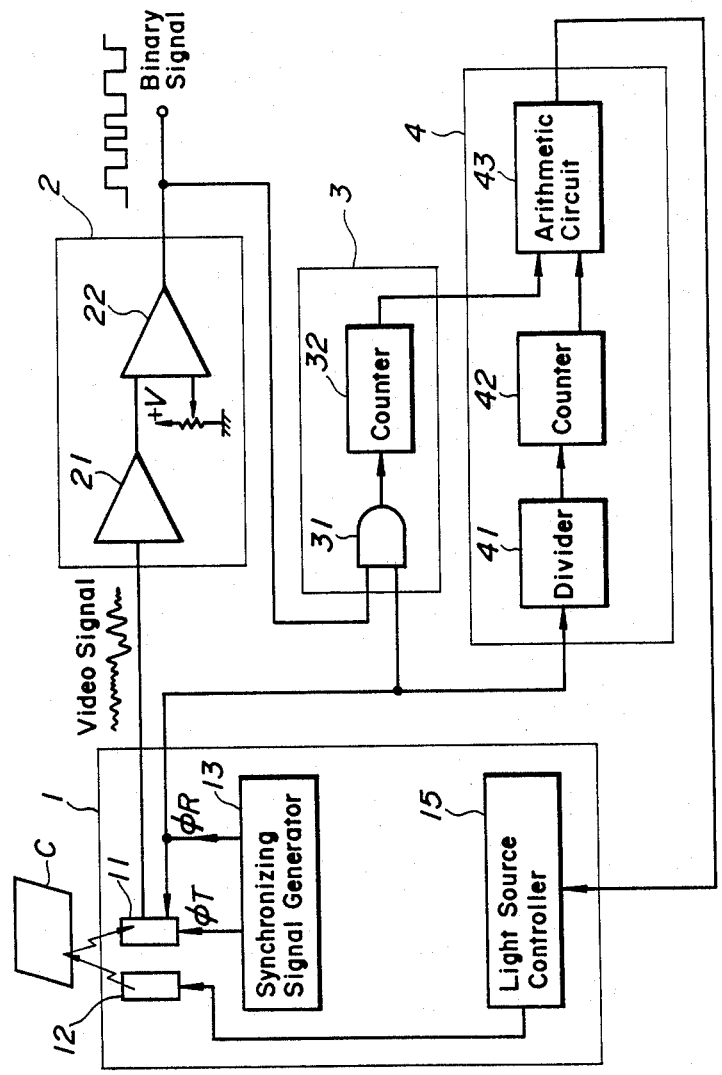
FIG. 8 is a block diagram of the second embodiment of this invention.

FIG. 8 shows the structure of the second embodiment of this invention which comprises a reading means 1, a video signal binary encoding means 2, a mark rate detecting means 3, and a discriminating means 4. The reading means 1 is provided with a light source controller 15 which is a sensitivity adjuster to control the amount of light emitted onto an optical memory card C from a light source 12 in correspondence to said deviation signals. The structure and operational effect of the second embodiment are identical to those of the first embodiment except for the light source controller 15. Description is omitted for duplicate parts.

The light source controller 15 adjusts the brightness or the amount of the light emitted from the light source 12 (hereinafter referred to simply as brightness) in correspondence to the deviation signals from the discriminating means 4. More particularly, if the mark rate detected from the binary signals is higher than 50%, it reduces the brightness of the light source 12 while if it is lower than 50%, it increases the brightness by varying the light source driving current or voltage.

As a result, the amount of the light reflected from the optical memory card C is increased/decreased to increase/decrease the amount of the light received with photodetectors of the CCD linear sensor 11 to maintain the output of the video signals at a proper level. The data on the mark rate detected when the video signals are converted into binary signals can be fed back and the output level of the video signals is automatically adjusted to achieve the mark rate of 50%. The video signals are therefore converted into binary signals precisely to enhance the reading precision at the reading device.

STRUCTURE AND OPERATIONAL EFFECT OF THE THIRD EMBODIMENT

Figure 9:
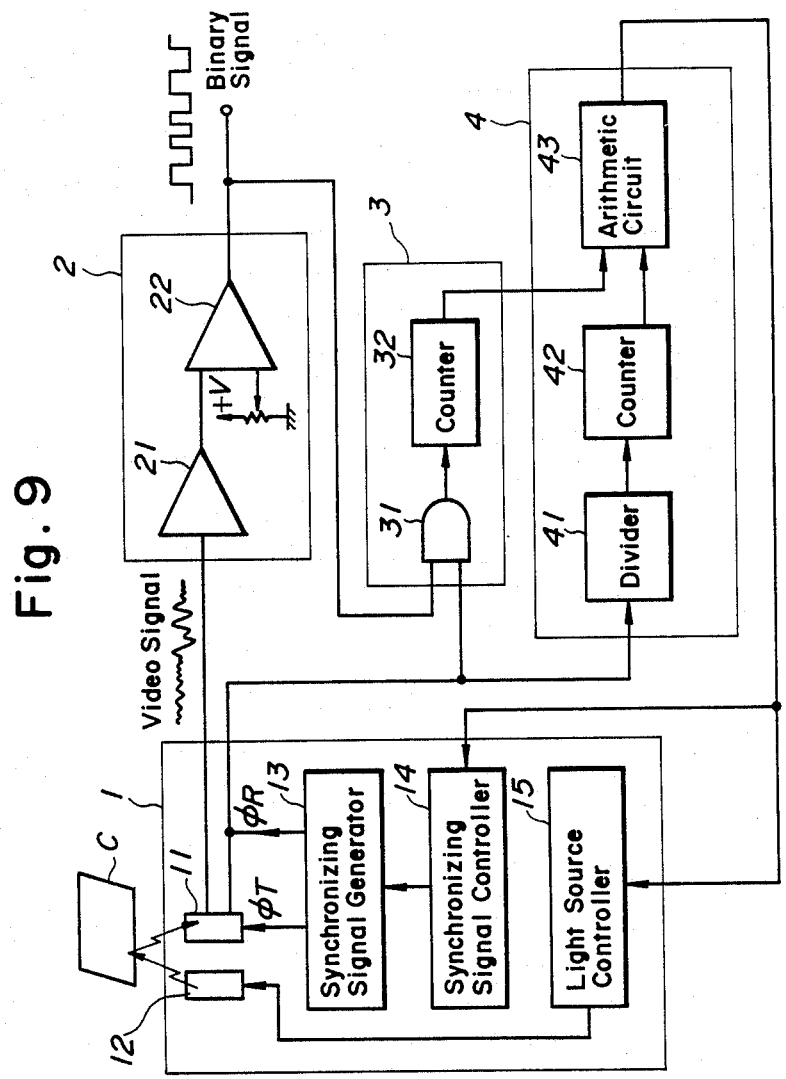
FIG. 9 is a block diagram of the third embodiment of this invention.

FIG. 9 shows the structure of the third embodiment of this invention which comprises a reading means 1, a video signal binary encoding means 2, a mark rate detecting means 3, and a discriminating means 4. The reading means 1 is further provided as sensitivity adjusters with a synchronizing signal controller 14 which adjusts the interval of the output vertical synchronizing signals $\phi T$ and a light source controller 15 which adjusts the amount of the light from the light source 12 emitted onto the optical memory card C in correspondence with said deviation signals. The third embodiment is identical in the structure and operational effect thereof to those of the first and second embodiments except for the synchronizing signal controller 14 and the light source controller 15. Description is therefore given only to these two circuits to avoid duplication.

In this embodiment, the deviation signals from the discriminating means 4 are inputted both at the synchronizing signal controller 14 and the light source controller 15.

In correspondence to such deviation signals, the synchronizing signal controller 14 adjusts the output interval of the vertical synchronizing signals $\phi T$. More specifically, if the mark rate detected from the binary signals is higher than 50%, it shortens the storage time; but if it is lower than 50%, it extends the storage time to control the interval.

Simultaneously, the light source controller 15 adjusts the brightness at the light source 12 in correspondence to the deviation signals. In other words, if the mark rate detected from the binary signals is higher than 50%, it reduces the brightness at the light source 12 while if it is lower than 50%, it increases the brightness by varying the light source driving current or voltage.

As a result, the amount of the light reflected from the optical memory card is adjusted to increase/decrease the storage times at respective photodetectors of the CCD linear sensors to keep the output of the video signals at a proper level. In other words, when the video signals are converted into binary signals, a portion thereof is fed back to automatically adjust the output level thereof to achieve the mark rate of 50%. By such a manipulation, the video signals can be encoded into binary signals precisely to enhance the reading precision at the reading device.

STRUCTURE OF THE FOURTH EMBODIMENT

Figure 10:
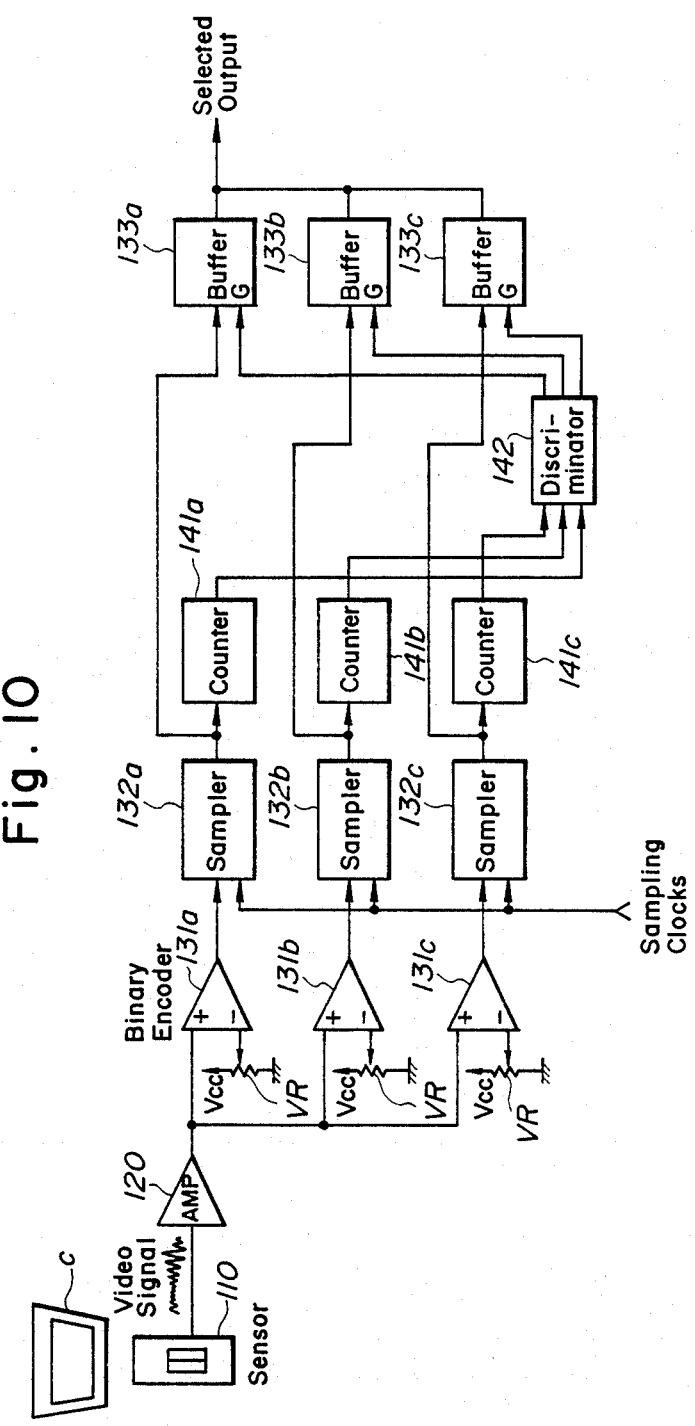
FIG. 10 is a block diagram of the fourth embodiment of this invention.

FIG. 10 shows the structure of the fourth embodiment of this invention.

This embodiment includes a binary encoding means which encodes video signals into binaries when they are inputted via an amplifier 120 from a CCD linear sensor 110 which is positioned opposely to an optical memory card C to read out data, comparators 131a, 131b, 131c and samplers 132a, 132b and 132c. The embodiment further includes buffers 133a, 133b and 133c as means for temporarily holding binary encoded signals for plural groups.

It further includes group selecting means counters 141a, 141b and 141c and a discriminator 142 which issues a direction for the output of the binary signals to a holding means of the group where the rate of the high or low level of the binary signals within a unit time becomes closest to the preset mark rate.

The comparators 131a, 131b and 131c may be operational amplifiers which receive video signals at the non-inverting terminals thereof and thresholds or the reference for comparison at the inverting terminals thereof. The thresholds are formed by respectively dividing the power source voltage Vcc with variable resistances VR.

The variable resistances VR at the comparators 131a, 131b and 131c are adjusted to have different thresholds. As shown in FIG. 11, thresholds in this embodiment are set separately by referring to the case where the average level of the video signals is a normal value. In other words, the threshold a is set at the level where the rate of either the high or low level of the binary signals within a unit time is larger than the mark rate of 50% or at the level corresponding to the bottom portions of the wave forms, threshold b is set at the level substantially corresponding to the mark rate of 50% or the half-amplitude level, and threshold c is set at the level where the rate is smaller than the mark rate of 50% or the level corresponding to the peak portions of wave forms.

The samplers 132a, 132b and 132c may be, for instance, logical operation circuits such as AND gates which sample either the high or low level signals (the high level signals in this embodiment) in binary signal output from the comparators 131a, 131b and 131c.

The second components of this embodiment or the buffers 133a, 133b and 133c may comprise registers or random access memories. These buffers 133a, 133b and 133c are provided with gate circuits (not shown) which control outputs. They output stored data to a data bus (not shown) for supplying the data to data processors when an output authorizing signal is inputted.

The third components or the counters 141a, 141b and 141c may, for instance, comprise counters which count pulses in the output signals from the samplers 132a, 132b and 132c.

Another third component or the discriminator 142 may, for instance, comprise registers or memories which hold counted values from the counters 141a, 141b and 141c and an arithmetic circuit. The operational circuit is set with the reference mark rate in advance, and compares respective counted values with the reference mark rate to output an output authorizing signal to either one of the buffers 134a, 134b and 134c of the group which outputs binary signals closest to the reference mark rate.

OPERATIONAL EFFECT OF THE FOURTH EMBODIMENT

Figures 2, 3:
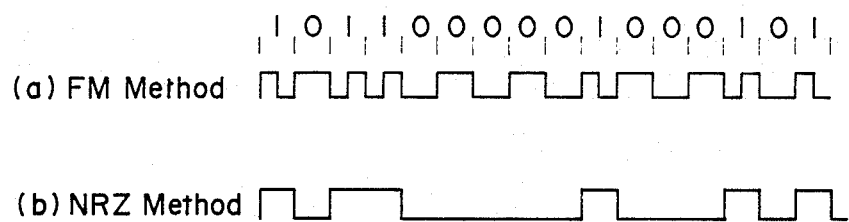
FIG. 2 shows wave forms to compare the FM encoding method which is used as a prerequisite in this invention with the NRZ method.
FIG. 3 is an explanatory view to show examples of mark rates of the data encoded by the FM encoding method.
Figure 4:
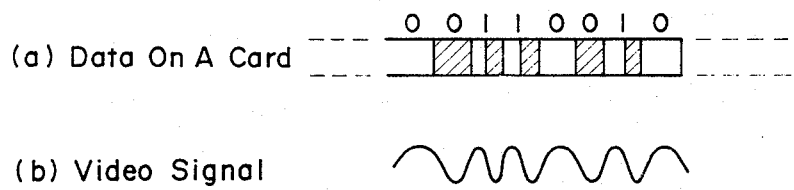
FIG. 4 is an explanatory view to show the relation between the data on an optical recording medium and video signals.
Figure 5:
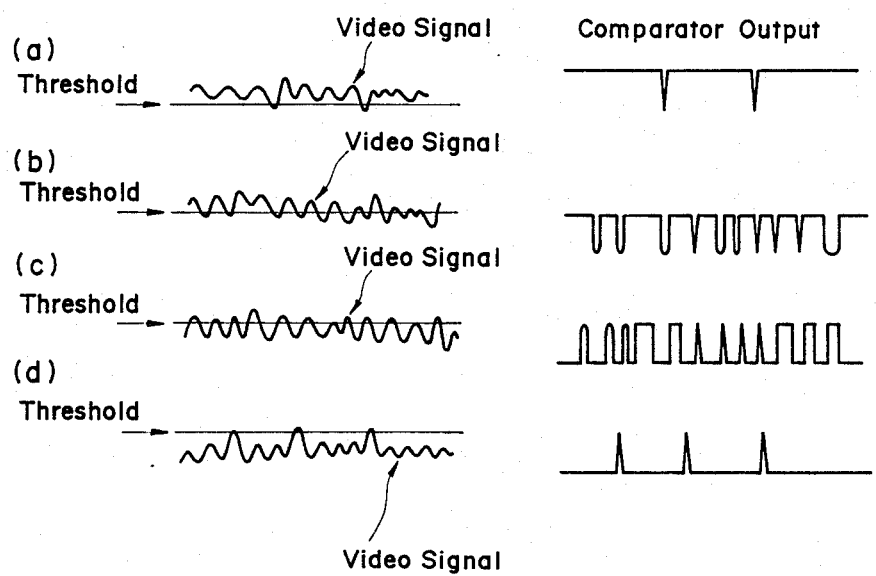
FIG. 5 shows wave forms to show the relation between the video signals and thresholds in encoding them into binary codes.

In the structure mentioned above, the CCD linear sensor 110 detects with the photodetectors arranged in linear arrays thereof the light reflected from the recording medium of the optical memory card C and outputs serial data in accordance with a predetermined clock pulses. The outputs become the video signals of the wave forms shown in FIG. 4(b). The video signals are amplified by the amplifier 120 and inputted at the comparators 131a, 131b and 131c of the binary encoding means.

The comparators 131a, 131b and 131c are set with thresholds at aforementioned values by adjusting the variable resistances VRs. The video signals are compared with respective thresholds at comparators 131a, 131b and 131c respectively. Out of the wave forms of the video signals, those higher than the thresholds are outputted as the high level or "1" while those lower than the thresholds are outputted as the low level or "0".

FIG. 11 shows the state of comparison. In the figure, the regions marked with hatched lines denote the time during which the binary encoding results in "1".

The binary encoded signals are respectively inputted at the samplers 132a, 132b and 132c to be sampled for high level portions. The sampling is conducted in synchronization with the sampling clocks from a synchronizing signal generator (not shown) to discriminate whether or not the level of the output wave form of the binary signals is at the high level when the sampling clock is inputted, and to sample it if it is at the high level. More particularly, binary signals of all the groups are synchronized based on the sampling clocks.

The signals thus sampled are stored as the reading out data at the buffers 133a, 133b and 133c. The data are sequentially stored at the buffers 133a, 133b and 133c in the first-in first-out manner. The data stored in respective buffers are outputted only when the output authorizing signals from a discriminator (which will be described hereinafter) are inputted at the gate control terminal G.

The signals sampled at the samplers 132a, 132b and 132c are supplied to the group selecting means to count the high level signals thereof at the counters 141a, 141b and 141c respectively corresponding to the samplers 132a, 132b and 132c. For instance, the number of high level states within a unit time is counted.

The counted values are inputted at the discriminator 142 which obtains through comparison and operation the values identical or approximate to the preset mark rate (50% in this embodiment).

It is assumed that the wave forms of the video signals have the relation depicted by the solid line B in FIG. 11 with the thresholds. In the group a set with the threshold a the mark rate of the binary signal output is larger than 50% while in the group c set with the threshold c it is smaller than 50%. In the group b set with the threshold b, on the other hand, the mark rate of the output in binary signals thereof becomes ca. 50%, or the counted value closest to the preset mark rate.

Under these conditions, an output authorizing signal is fed to the buffer 134b of the group b. Upon receiving the signal, the buffer 132b open the output gate to output to the data bus the data which have been stored there up until then.

It is assumed that the wave forms and the thresholds have the relation depicted by the broken line A or C in the figure. In the former case, the video signals are shifted toward the side of the low level while in the latter case they are shifted toward the side of the high level. The mark rate in these cases would not become 50% with the threshold b of the group b. In the prior art devices, FM decoding could quite possibly be erroneously executed in these cases. However, in this embodiment, the output in binary codes may be substantially 50% by using the threshold a for the former case and the threshold c for the latter case to thereby enable precise FM decoding in reading.

As a result the video signals can be converted into binary signals correctly to enhance the reading precision at the reading means.

MODIFIED EMBODIMENTS

Inventions of this application are not limited to aforementioned embodiments but may freely be modified for various applications. Several modifications are exemplified below.

Although the video signals at the high level are sampled by the mark rate detecting means in the above embodiments, those at the low level may be sampled.

Although the mark rate is set at 50% in the above embodiments, it may be set arbitrarily in correspondence to the mark rate in encoding of the optical memory cards.

Although in the above first to third embodiments, the output signals for the video signal binary encoding means are described in the binary encoded output, the result of sampling at the mark rate detecting means may be outputted in the binary signals. If they are outputted in the form, the binary signals are outputted in synchronization with the horizontal synchronizing signals to enable smooth signal processing at the subsequent stage.

In the above first to the third embodiments, the reference mark rate is set by dividing the synchronizing signals and counting the same, but this invention method is not limited to the above. For instance, the mark rate may be fixedly set at a register as a counted value in a unit time, the counter at the mark rate detecting means is reset once in the unit-time, and the value counted in each unit time is compared to the set values to thereby obtain the deviation.

Although the binary encoding means are arranged in parallel in the three groups of a, b and c in the above embodiments, the number of the groups may be four or larger.

What is claimed is:

1. A binary encoding device for the data read from an optical record for photo-electrically reading the data which are encoded by an FM encoding method and recorded on an optical recording medium by a reading means and encoding the obtained video signals into binary signals by comparing the same with a threshold, said device comprising;
   a mark rate detecting means which detects the mark rate (rate of either the high or low level in a unit time) of said binary encoded signals;
   discriminating means which compares detected values with a preset mark rate to obtain the deviation therebetween and outputs deviation signals to said reading means,
   sensitivity adjusting means which is provided at the preceding stage of said reading means to adjust the reading sensitivity of said reading means in correspondence to said deviation so as to give the binary encoded signals said preset mark rate, and
   a CCD linear sensor which is used as said reading means,
   said reading means further comprising a synchronizing signal generator which outputs vertical synchronizing signals for setting storage time of the CCD linear sensor and horizontal synchronizing signals which transfer electric charges stored at each photodetector, and a synchronizing signals controller as said sensitivity adjuster which adjusts the output interval of the vertical synchronizing signals corresponding to said deviation signals.

2. The binary encoding device for the data read from an optical record as claimed in claim 1 which is further characterized in that said reading means is provided with a light source controller as said sensitivity adjuster which adjusts the amount of light emitting onto an optical recording medium in correspondence to said deviation signals.

3. The binary encoding device for data read from an optical record as claimed in claim 1 which is further characterized in that said reading means is further provided with as said sensitivity adjusting means a light source controller which adjusts the amount of the light from the light source emitted onto an optical recording medium in correspondence to said deviation signals.

4. The binary encoding device for the data read from an optical record as claimed in any one of the claims 1, 2 or 3 wherein the mark rate to be preset is 50%.

5. A binary encoding method for the data read from an optical record comprising the steps of photo-electrically reading the data which are encoded by an FM encoding method and recorded on an optical recording medium by a reading means and encoding obtained video signals into binary signals by comparing the same with a threshold, which is characterized in that said video signals are distributed into plural groups and encoded into binary codes by referring to different thresholds set for each group, thus encoded signals are sampled from either the high or low level thereof in synchronization with predetermined sampling signals and the number thereof is counted to produce values, the values thus counted at each group in a unit time are compared with a preset mark rate, and the binary encoded signals of the group having the counted values closest to the preset mark rate are recognized as the proper output signals.

6. The binary encoding method for data read from an optical record as claimed in claim 5 wherein the mark rate to be preset is 50%.

7. A binary encoding device for the data read from an optical record for photo-electrically reading the data which are encoded by an FM encoding method and recorded on an optical recording medium by a reading means and encoding the obtained video signals into binary signals by comparing the same with a threshold, which is characterized by the structure comprising binary encoding means of plural groups which encode said video signals into binary codes by referring to different thresholds, temporary holding means for plural groups which temporarily hold binary signals encoded by said plural binary encoding means respectively, and a group selecting means which compares the rate of the high or low level of binary signals encoded by said binary encoding means of each group in a unit time with a preset mark rate and directs the output of the binary signals to the temporarily holding means of the group having the rate of the high or low level in a unit time closest to the preset mark rate.

8. The binary encoding method for the data read from an optical record as claimed in claim 7 wherein the mark rate to be preset is 50%.

* * * * *